(12) United States Patent
Flanagan

(10) Patent No.: US 7,386,831 B2
(45) Date of Patent: Jun. 10, 2008

(54) INTERACTIVE COLLABORATIVE FACILITY FOR INSPECTION AND REVIEW OF SOFTWARE PRODUCTS

(75) Inventor: Mark J. Flanagan, Boynton Beach, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 398 days.

(21) Appl. No.: 10/042,616

(22) Filed: Jan. 9, 2002

(65) Prior Publication Data

US 2003/0131313 A1 Jul. 10, 2003

(51) Int. Cl.
*G06F 9/44* (2006.01)
*G06F 15/00* (2006.01)
*G06F 15/16* (2006.01)

(52) U.S. Cl. ............ 717/103; 715/500; 715/530; 709/204

(58) Field of Classification Search ........ 717/100–103; 715/500–530, 751–753; 705/11, 80; 709/204
See application file for complete search history.

(56) References Cited

U.S. PATENT DOCUMENTS

| | | | | |
|---|---|---|---|---|
| 5,537,618 | A * | 7/1996 | Boulton et al. | 715/745 |
| 5,706,452 | A * | 1/1998 | Ivanov | 715/751 |
| 5,799,320 | A * | 8/1998 | Klug | 707/201 |
| 5,950,217 | A * | 9/1999 | Heinlein et al. | 715/530 |
| 6,199,193 | B1 * | 3/2001 | Oyagi et al. | 717/101 |
| 6,507,865 | B1 * | 1/2003 | Hanson et al. | 705/36 R |
| 6,654,032 | B1 * | 11/2003 | Zhu et al. | 715/753 |
| 6,983,263 | B1 * | 1/2006 | Demko et al. | 705/80 |
| 7,007,232 | B1 * | 2/2006 | Ross et al. | 715/530 |
| 7,107,518 | B2 * | 9/2006 | Ramaley et al. | 715/501.1 |
| 7,194,679 | B1 * | 3/2007 | Green | 715/513 |
| 7,209,948 | B2 * | 4/2007 | Srinivasa | 709/204 |
| 7,234,131 | B1 * | 6/2007 | Speyrer et al. | 717/101 |
| 2002/0133395 | A1 * | 9/2002 | Hughes et al. | 705/11 |

OTHER PUBLICATIONS

Philip M. Johnson, "An Instrumented Approach to Improving Software Quality through Formal Technical Review", 1994, IEEE.*
J. Gintell, J. Arnold, M. Houde, J. Kruszelnicki, R. McKenney, G. Memmi, "Scrutiny: A Collaborative Inspection and Review System", Apr. 20, 1993.*
L. Brothers et al., "Icicle: Groupware For Code Inspection", Oct. 1990.*
H. Abdel-Wahab et al., "Shared Workspaces for Real-Time Collaboration in Distributed Networks: Concepts, Techniques, Problems", 1987.*
Gehringer, "Electronic Peer Review and Peer Grading in Computer-Science Courses", ACM, 2001, pp. 139-143.*
"Codestriker", Copyright 2001, David Sitsky, http://codestriker.sourceforge.net.
"Project: Code striker", Copyright 2002, http://sourceforge.net/projects/codestriker.

* cited by examiner

*Primary Examiner*—Meng-Ai T. An
*Assistant Examiner*—Jennifer N. To

(57) ABSTRACT

A review facility and review method for interactively reviewing an item, such as a block of code, by a group of reviewers and collecting comments from the reviewers. An author provides the item as text for preparation for interactive review. The text is prepared, tagging each line and making the tagged text available to reviewers, e.g., as links on a web page. Reviewers interactively comment on individual lines and review previously entered comments. An abbreviated formal review may follow the interactive review.

11 Claims, 2 Drawing Sheets

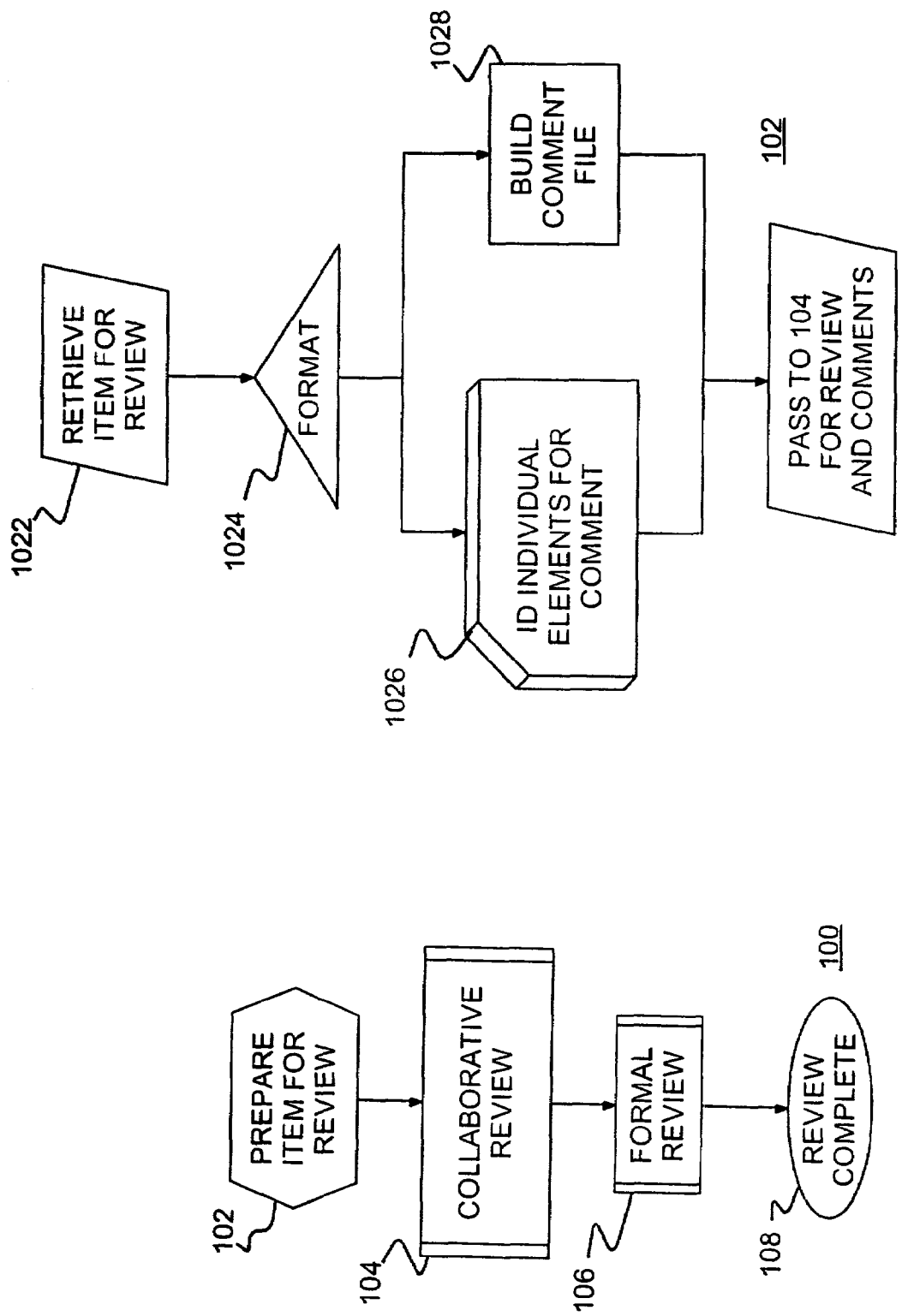

INTERACTIVE COLLABORATIVE FACILITY FOR INSPECTION AND REVIEW OF SOFTWARE PRODUCTS

BACKGROUND OF THE INVENTION

1. Field of the Invention

The present invention is related to software package development and more particularly to reviewing and approving software products at various stages of development.

2. Background of the Invention

Most large development projects such as developing a consumer software package are collaborative efforts. Typically, these are modular projects where individuals or small groups are each assigned a specific development task. Such a task may be to write a specific piece of code for large software package, e.g., a subroutine, a macro, etc. Normally, after each participant develops his or her particular code to a point where it may be complete or close to completion, the code is reviewed for approval.

Prior to the review, the author or a moderator creates a static packet of the code for review and distributes the packet to all reviewers. After a suitable period of time, the author or moderator holds the packet review meeting wherein one person, e.g., the author or developer, reads the code aloud and reviewers are allowed to comment and identify errors or problems with the code. Comments are recorded and the author may take whatever action he or she feels is necessary such as, for example, correcting errors or rewriting portions of code. These code inspection or review meetings are integral parts of software development processes.

Generally, these code inspections are done manually, providing each reviewer with a paper copy of the code and, review/inspection meetings generally take a great deal of time. A typical code inspection/review meeting may cover 100 to 125 lines of code per hour. For a large software module, e.g., a couple of thousand lines long, this review can be a long tedious process.

SUMMARY OF THE INVENTION

It is a purpose of the present invention to reduce the time required by reviewers to review an item;

It is another purpose of the present invention to facilitate code development and review.

The present invention is a review facility and method for interactively reviewing an item, such as a block of code, by a group of reviewers and collecting comments from the reviewers. An author provides the item in text for preparation and interactive review. The text is prepared, tagging each line and making the tagged text available to reviewers, e.g., as links in a web page. Reviewers interactively comment on individual lines and review previously entered comments. An abbreviated formal review may follow the interactive review.

BRIEF DESCRIPTION OF THE DRAWINGS

FIG. 1 shows a flow diagram of an example of an interactive collaborative facility according to a preferred embodiment of the present invention;

FIG. 2 is a flow diagram of an example of the first primary step;

DESCRIPTION OF THE PREFERRED EMBODIMENT OF THE PRESENT INVENTION

Figure 3:
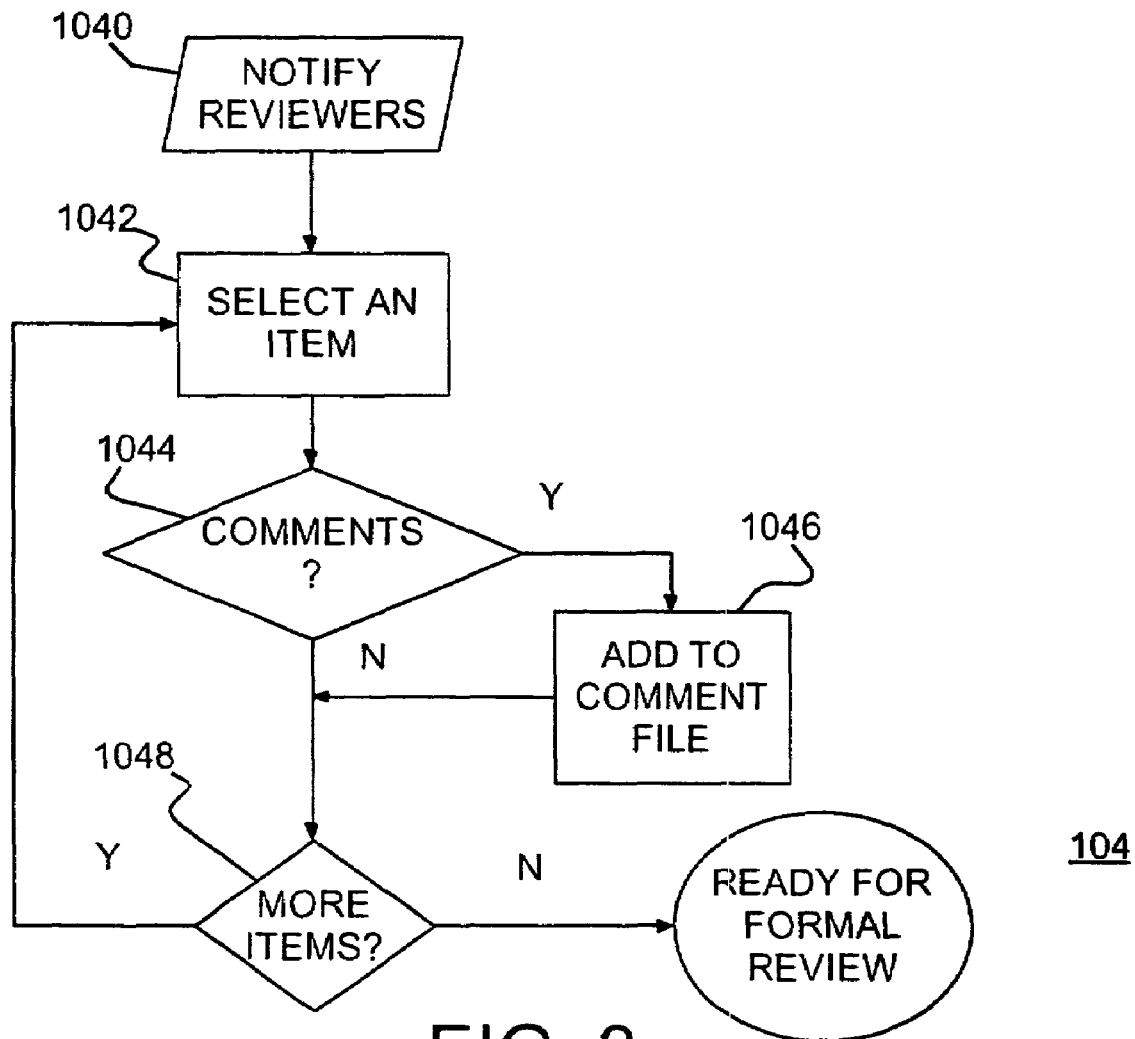
FIG. 3 shows a flow diagram of an example of the interactive, collaborative review process step.

Turning now to the drawings, FIG. 1 shows a flow diagram of an example of an interactive collaborative facility 100 according to a preferred embodiment of the present invention. The interactive collaborative facility 100 may be described as including three primary phases or steps. In the first primary step 102, items (e.g., software code including, for example, modules, macros, subroutines, etc.) are prepared for consideration or review. In step 104, the items are reviewed interactively in an on-line review, e.g., by remotely located reviewers connecting to the facility over the Internet to access and review items. Participants review the items and comment on-line. Comments are collected and stored in a central repository. Then, at an abbreviated formal review meeting in step 106, any outstanding issues that may remain for any item are resolved to complete the review in 108.

It is understood that, although described herein for reviewing software, the present invention may be applied to any similar review process, such as for example, a document review wherein a master copy of a document is distributed to multiple individuals who individually annotate the document and return the annotated document to the distribution. Comments for such a document may be directed to any selected block of text or granularity, i.e., sentence, paragraph, page, chapter or any other selected text block size. Advantageously, applying the present invention to such a process accelerates final approval of the document or other project.

FIG. 2 shows a flow diagram of an example of the first primary step 102 of FIG. 1. In step 1022 the author retrieves the item to be prepared for review, e.g., from personal storage. Next, the item, e.g., a static code packet, is formatted for inspection in step 1024. Formatting the item for inspection defines review granularity (i.e., the specificity of review) and identifies individual elements in step 1026 (e.g., a line of source code) within the item for comments by reviewers. Then, all the identified elements are gathered and collected into a known location, e.g., a database in a central repository. Coincidentally, an initially empty comment file is constructed in step 1028 for collecting comments, questions and noting errors. The comment file also may be passed to the central repository.

So, for example, a preparation facility accepts a collection of source code, e.g., as a text file, and generates formatted HTML pages with line numbers, each linked to a comment entry form. Also, a table of contents pointing to individual items or source code blocks is prepared for the entire source code file. Then, the prepared items and the comment file are made available for review in step 104, e.g., as an interactive web page. The web page displays, for example, the table of contents and any comments for the currently selected item. Reviewers are prompted to review the source code and review begins by selecting individual item links and entering comments on elements (lines) in the comment file. If additional file information detail is desired, e.g., source code metrics, etc., the preparation facility may provide for collecting such information. Source code metrics may include, for example, the number of lines of text and/or code, the number of comments, etc.

In yet another example, a simple Perl script file may be created (e.g., "make_web_review.pl") to accept source code and produce formatted, linked HTML pages ready for publication. The third-party (open-source) Perl package "code2html" may be used to "pretty-print" the source code, e.g., as a web page or in a frame on a web page. Code display formatting may be adjusted by modifying a code2html.css style sheet. Each source file identified to the make_web_review script is formatted into a new subdirectory, e.g., filename.ext.html. A table of contents is generated with links to each of these source files. Also, a generic review frame set and generic instructions page is copied into each subdirectory, while a javascript source file for cookie handling and report linkage is generated for each particular review. So, for a C/C++ file a code analyzer, such as the Resource Standard Metrics tool from M Squared Technologies, may be used to compute standardized metrics for the code to be inspected.

Continuing this example, the make_web_review script accepts specific parameters to locate the source files and tailor the generated package. These parameters may include a parameter specifying a base path (base) to the source files being prepared. A destination parameter (dest) specifies the path to the destination subdirectory where the prepared files are to be stored. In some systems, this destination subdirectory must exist before running the make_web_review script. A HTML link location variable (html) indicates the prepared package location and is generally different than the dest location. A HTML link location specifies the Common Gateway Interface (CGI) portion of the review facility as described below. This CGI link may be in a centralized CGI directory or a link that is unique to each review, as selected by the web administrator controlling the review publication facility. Any remaining parameters are provided by another variable that specifies either specific file paths, paths to directories containing files, or subdirectories of the base parameter where the source files to be prepared are located.

FIG. 3 shows a flow diagram of an example of the interactive collaborative review process step 104 carried out by each reviewer. This is basically an iterative process that begins in step 1040 when reviewers are prompted to review the source code. Then, for each reviewer in step 1042 the reviewer selects a linked item, e.g., the first time through step 1042 the reviewer selects the first file or item to inspect. In step 1044 the reviewer is presented with any comments that have already been entered and decides whether the item is acceptable or, if it needs further comment. Comments are linked to an element within the selected item and may be displayed for the reviewer in a separate window or frame. If any comments are required, then in step 1046, the reviewer enters his/her comments to indicate changes that should be made to one element or that another element contains an error, etc., and the comments are included with those from other reviewers.

Preferably, comments are collected in a central repository, as each is made and immediately made available to reviewers, e.g., by the reviewer refreshing his/her display. Thus, each reviewer is presented with all previous and current comments, similar to chat in a chat room or messages in an instant messenger. This reduces the likelihood of redundant comments, e.g., 15 reviewers noting that the same word in line 23 is misspelled. Optionally, all comments are collected for each reviewer and distributed together after the reviewer has completed review. After commenting or, if the reviewer decides that no additional comments are required for the current element, a check is made in step 1048 to determine whether more items (more files) remain to be reviewed. If more remain, returning to step 1042, the reviewer selects the next element and continues the review. Once all of the items have been reviewed, the reviewer's comments have been received and distributed and comments from other reviewers have been provided to the reviewer, the item may be passed for a formal review meeting in step 106.

The author or inspection moderator may provide comment responses to all reviewers. Responses may be presented to reviewers either contemporaneously, as comments are entered or, when all reviewers have completed their review and provided their comments. Each reviewer may review the author's response, checking off those that are clear and where corrections are simple. Any remaining comments are classified as inspection meeting items or action items. By providing each reviewer with an opportunity to enter comments prior to an inspection/review meeting, the majority of corrections, especially for minor errors, are addressed prior to the meeting. The otherwise very time-consuming "reading" process is eliminated from the inspection meeting to allow meeting participants to focus on more serious items, i.e., those where significant discussion may still be necessary.

This interactive collaborative review step 104 involves two classes of activities. The first class of activity is collaborative, where collaborators view comments and examine the item in detail as a file placed on a server using a web browser, for example. The collaborators can comment, pose questions or note errors found in the file. The comments are passed back to the server and placed in a comment file. Optionally, each user may be allowed to selectively view all remarks for the file or all remarks for a particular user. The comment file is made available interactively to all the collaborators along with an identification of both the source of each comment and the element within the item (source code file and line number in this example) to which the particular comment is directed. The second class of activity is file management and communication activity by the server managing the files with the formatted item, the item elements and the comment file. The server makes the elements and reviewer comments available to reviewers and accepts any additional individual reviewer comments and author responses, also making those available.

The preferred collaborative facility 100 of FIG. 1 may include a Perl program executing as a CGI extension to an Apache web server. As reviewers enter comments into a remark entry form, the entries are passed as CGI data to the Perl program which validates the information form and records remarks in the central review data store. Also, the same CGI program may provide for retrieving previously stored information, e.g., comments, responses, etc. Optionally, at the reviewer's discretion, comment retrieval may be limited to a particular file, set of files or inspection elements, a particular user's comments, combinations thereof, or all stored information. Each remark in the comment file is hyper-linked to the specific element (file and line number) to which it applies.

So, after the collaborative interactive review step 104, a more traditional formal review meeting is held in step 106. As noted above, this formal review meeting 106 has much fewer issues to resolve and so, typically, is much more abbreviated from what would normally have taken place because most comments have been received and acted upon by the author prior to the meeting 106. Thus, this formal review meeting 106 is limited, typically, to reviewing only changes or corrections made to the code, remarks entered and collected during the review by the collaborators and clarifying remarks that may not be understood. Once this formal review meeting 106 is complete, the item (e.g., macro, subroutine, etc.) is good to go.

Thus, the actual code inspection meeting of step 106 need only focus on comments already provided as discussion points. This greatly reduces the actual meeting time for the inspection meeting because most of the reviewers have already reviewed the code and so, most of the code does not require additional consideration. After any outstanding issues are resolved, the author completes the inspection process by correcting the identified problems and the moderator verifies the corrections. Re-publishing the corrected code is optional and may be useful when the item is subject to corrections.

The inspection report (i.e., the output from the review meeting) may be simplified using collected metrics from the comment review file. For example, a typical well known text processing tool may be used to count the number of major and minor errors identified. Also, many companies use standardized metrics, lines of code, number of comments, etc. to measure productivity. Metrics such as the number of errors found per 1000 lines of code, number of defects detected at various times—during code reviews, during component testing, during system testing—can be useful as well. Typically, many of these metrics are used to justify various expenditures for improved tools or the like, but occasionally differing project methodologies are compared using this kind of metric. For example, the 1970's style "waterfall" methodology of development fell to the 1990's style "object oriented" (OO) methodology based on studies that showed that the number of defects in the resulting product measured against the development costs went down using OO. So, if desired, a list of files, metrics, and comments both minor and major can be collected directly from the data.

Thus, for example output of a project, e.g., blocks of source code, is formatted and treated as a series of related web pages, one for each block. A table of contents is displayed providing a series of web links or internet links to the blocks. Selecting a link can select one file to be reviewed and the selected file is displayed. Within the displayed file links are provided at each line of code, for example. Formatting a text file to interface with viewers is well understood in the art. Once formatted, selecting a line of code brings up an interface for inputting comments about the selected line, e.g., opening a chat room, instant messenger or a frame somewhere on the page where comments are entered and displayed. Furthermore, the comments may be classified or typed, for example, as Comments, Questions, Corrections and, Major/Minor error annotations. Thus, a reviewer can pull up a group of one particular type of comment, e.g. all questions, all corrections, etc. Also, the reviewer can selectively view comments, e.g., all comments for one reviewer, and respond. The formal review is scheduled after an appointed date, e.g., a scheduled end of review date, which may coincide with the end of the normal prior art review period, i.e., the end of the period allocated for the prior manual review.

Advantageously, because all reviewers have commented and received responses to most if not all comments, the formal review proceeds much more quickly and efficiently to a conclusion and to approval of the code. Thus, the present invention is a much more efficient and quicker process than prior art reviews.

While the invention has been described in terms of preferred embodiments, those skilled in the art will recognize that the invention can be practiced with modification within the spirit and scope of the appended claims.

What is claimed is:

1. A review facility having a processor for providing a document for collaborative review by a plurality of reviewers and collecting comments from reviewers, said review facility comprising:
    preparation means for preparing software source code for interactive collaborative review comprising:
        selection means for selecting and retrieving said software source code, and
        means for formatting said retrieved software source code and building a comment file, wherein the means for formatting said software source code identifies individual lines of said source code within said software source code, said interactive collaborative review providing comments on ones of said individual lines of said source code;
    means for making said prepared software source code available for interactive collaborative review, said prepared software source code being independently reviewable in said interactive collaborative review;
    means for collecting comments on said individual lines of said source code in said prepared software source code from said interactive collaborative review, collected comments on code lines being contained in said comment file;
    means for distributing collected said comments from said interactive collaborative review; and
    means for conducting a formal review, wherein distributed said comments sufficiently provide any collaborating reviewers attending a subsequent formal review meeting with awareness of a particular condition with respect to said interactive collaboratively reviewed said software source code that said comments may be addressed in said interactive collaborative review prior to said formal review meeting, such that further action is unnecessary at the time of said formal review with respect to said particular condition and each corresponding said comment.

2. A review facility as in claim 1 wherein the means for collecting comments comprises:
    means for providing said software source code to collaborating reviewers; and
    reviewer selection means for selecting said software source code for review responsive to reviewer selection.

3. A review facility as in claim 1, wherein said means for distributing collected said comments makes collected said comments available for further interactive collaborative review, and said review facility further comprises:
    means for presenting for consideration collected comments from said interactive collaborative review, said collected comments being previously distributed by said means for distributing collected comments to identified collaborating reviewers participating in a formal review.

4. A method of reviewing a document being prepared for distribution, said method comprising the steps of:
    a) preparing source code for interactive review, preparing said source code comprising the steps of:
        i) retrieving said source code for review, and
        ii) formatting said source code and building a comment file, individual blocks of text being identified for comment in said formatted source code, individual lines of source code being identified for comments;
    b) making said prepared source code available for said interactive review and receiving comments on said prepared source code from said interactive review, comments provided on said lines of source code being contained in said comment file; and
    c) conducting a formal review meeting of said interactively-reviewed source code with a plurality of reviewers, whereby one or more of the previously provided said comments sufficiently provides attending reviewers awareness of a particular condition with respect to said interactively-reviewed source code that said comments may be addressed in said interactive review prior to said formal review meeting, such that further action is unnecessary at the time of said formal review with respect to said particular condition and each corresponding comment.

5. A method as in claim 4 wherein each occurrence of said interactive review in the step (b) of making the prepared source code available comprises the steps of:
  i) selecting said source code;
  ii) reviewing comments on said selected source code;
  iii) determining whether said selected source code warrants additional comments;
  iv) distributing warranted additional comments on said selected source code; and
  v) repeating steps (i-iv) until all documents for review have been selected.

6. A method as in claim 5 wherein source code is stored in a central repository and the step (i) of selecting said source code comprises connecting over the Internet to said central repository and accessing said source code.

7. A method as in claim 4 wherein returned said comments are available for display upon receipt.

8. A computer program product for presenting a software source code block for collaborative review by a plurality of reviewers and collecting comments from reviewers, said computer program product comprising a computer usable medium having computer readable program code thereon, said computer readable program code comprising:
  computer program code means for preparing a source code block for collaborative review comprising:
    computer program code selection means for selecting and retrieving said source code block, and
    computer program code means for formatting retrieved source code blocks and building a comment file, individual lines of said source code being identified within said source code block;
  computer program code means for collecting comments from said collaborative review collected comments on code lines being contained in said comment file;
  computer program code means for distributing collected comments to reviewers identified for attendance at a subsequent formal review meeting, reviewers providing comments on ones of said individual lines, wherein distributed said comments sufficiently provide any identified said reviewers with awareness of a particular condition with respect to said interactive collaboratively reviewed source code blocks that said comments may be addressed in said interactive collaborative review prior to said formal review meeting, such that further action is unnecessary at the time of said formal review with respect to said particular condition and each corresponding comment; and
  computer program code means for providing distributed comments for said formal review.

9. A computer program product as in claim 8 wherein the computer program code means for collecting comments comprises:
  computer program code means for providing source code block to reviewers; and
  computer program code means for selecting said source code block for review responsive to reviewer selection.

10. computer-readable medium having stored thereon a plurality of instructions, the plurality of instructions including instructions which, when executed by a processor, cause the processor to:
  a) prepare source code for interactive review and further causing the processor to:
    i) selectively retrieve said source code for review, and
    ii format said source code and building a comment file, individual said lines of source code being identified for comment in said formatted source code;
  b) make said prepared source code available to a plurality of interactive reviewers for interactively commenting on said Lines of source code;
  c) receive comments from ones of said plurality of interactive reviewers, received comments being contained in said comment file; and
  d) present said source code and received said comments for a formal review meeting, whereby one or more-of the previously provided comments sufficiently provides attending reviewers awareness of a particular condition with respect to said source code that said comments may be addressed in said source code prior to said formal review meeting, such that further action is unnecessary at the time of said formal review with respect to said particular condition and each corresponding comment.

11. A computer readable medium as in claim 10 wherein source code is located in a central repository and the step i) of selectively retrieving said document causes the processor to connect over the Internet to said repository and access said source code.

* * * * *